United States Patent [19]

Hurtig et al.

[11] Patent Number: 4,573,352
[45] Date of Patent: Mar. 4, 1986

[54] APPARATUS FOR MEASURING WIND-SPEED AND/OR DIRECTION

[76] Inventors: Mats E. Hurtig, Vendelsö Skolväg 282, 136 71 Handen; Gösta K. Karlsson, Middagsvägen 12, 146 00 Tullinge, both of Sweden

[21] Appl. No.: 618,548

[22] Filed: Jun. 8, 1984

[51] Int. Cl.[4] .......................... G01W 1/02; G01P 5/00
[52] U.S. Cl. ................................. 73/189; 73/861.25; 367/90
[58] Field of Search ............... 73/170 R, 189, 861.25; 367/87, 90, 104, 120, 138; 343/5 W

[56] References Cited

U.S. PATENT DOCUMENTS 3,675,191  7/1972  McAllister ..................... 73/170 R
4,219,887  8/1980  MacCready, Jr. ............... 367/90
4,286,462  9/1981  Bourne ........................... 73/189

OTHER PUBLICATIONS

Armand et al., "Operating Conditions of an Acoustic Sounder in the Boundary Layer of the Atmosphere" Radio Engr. & Electr. Phys., No. 4, 1980.
Bourne et al., "The Remote Sensing of Wind in the Atmosphere Using Acoustic Radar" Proceedings 8th Imeko Cong. of I.M.C., Moscow, U.S.S.R.–May 1979.
Rosenberg, "Radar Wind Measurement System" Conf. Proc., No. 197 New Device & Techniques, The Hague, Netherlands, Jun. 1976.
Asimakopoulos et al., "An Acoustic Sounder for the Remote Probing of the Lower Atmosphere, Journal Physics, vol. 10, No. 1, pp. 47–50, Jan. 1977.

Primary Examiner—Charles A. Ruehl
Attorney, Agent, or Firm—Burns, Doane, Swecker & Mathis

[57] ABSTRACT

Apparatus for measuring windspeed and/or direction with the aid of a sound-wave transmitter (25) and a receiver (25) for receiving reflected sound waves, in which apparatus the sound waves (25a) are transmitted in a multiplicity of directions, and in which a compilation of the measuring result obtained with each measuring operation gives a measure of the speed and/or direction of the wind. The transmitter and/or the receiver (25) are arranged to rotate, so that measuring results from a plurality of measuring locations can be evaluated. The transmission lobe (25a) is inclined in relation to the axis of rotation of the transmitter and/or receiver.

19 Claims, 4 Drawing Figures

APPARATUS FOR MEASURING WIND-SPEED AND/OR DIRECTION

TECHNICAL FIELD

The present invention relates to apparatus of the kind with which the speed and/or direction of the wind can be measured with the aid of a sound-wave transmitter and a sound-wave receiver arranged to receive sound wave reflected from atmospheric layers, in which a compilation of the measuring result obtained with each measuring operation in each direction provides a measurement of the speed and/or the direction of the wind.

BACKGROUND ART

Apparatus of this kind are known to the art, and are based on the transmission of acoustic signals from three ground-located antennae which face in mutually different directions. It is known to position two of the antennae so that their centre axes, or the lines along which the sound waves are transmitted, form right angles with one another and are inclined at 60° to the plane of the ground, while positioning the centre axis of the third antenna vertically. The received echo signals are measured with respect to transit time and the so-called Doppler shift between transmitted and received frequencies, and the results obtained thereby are converted by calculation to the magnitude and direction of wind components at that time.

It is also possible in this respect to evaluate or determine the measuring results obtained from different height levels, so as to produce mean values and standard deviations. This enables wind components at mutually different height layers to be established.

The measurement values obtained are processed and calculated in a micro-processor, in order to establish the speed and direction of the wind at selected heights.

These measuring systems available today are dimensioned to manage heights of from 50–500 meters, under favourable conditions. Each of the three antenna units used in the system, however, is two meters high and weighs 130 kg/unit, which means that they must be placed on a trailer, if the system is to be made mobile. In addition hereto, the trailer must always be pointed in one and the same direction, for example from north to south, in order for the established wind-speed values to be correctly related.

DISCLOSURE OF THE INVENTION

Technical Problem

In conjunction with the development of apparatus of the aforesaid kind, there has arisen a number of important problems of a technical nature.

The fact that sound waves transmitted against the direction of the wind are deflected slightly in the wind direction means that the reflected echo becomes weaker. In addition, the background noise, the sound waves from surrounding environments, is more pronounced against the wind, which also has a deleterious effect on the measuring result in this direction. Thus, when reflected in space, sound waves transmitted in a direction opposite to that of the wind become weaker in the receiver and are mixed with a high level of background noise, which makes it difficult to obtain precisely defined measuring results, especially in this direction. In turn, this results in a discrepancy between the measuring values obtained from the three directions in which the measurements were taken, which restricts the reliability of the result established.

Moreover, it is desirable to be able to provide conditions which enable the measuring direction to be placed away from the direction of rain, since rain in the transmitters and receivers lowers the sensitivity.

Consequently, it is desirable to be able to provide conditions such that if, for example, three measuring directions are selected, the said measuring directions can be selected arbitrarily, in a manner to minimize as far as possible the deleterious affects of different error sources.

Fundamentally, the aforesaid technique is based on the measurement of sound waves reflected in strata between temperature layers in the air space. These layers are more or less diffuse, particularly at high wind speeds, and it has been established experimentally that the best measuring results can be obtained by measuring along two lines at an angle of 45° on a respective side of the wind direction.

Thus, it is desirable to be able to provide conditions which, irrespective of wind direction, enable the directions along which the measurements are made to be so selected as to minimize the effects of the diffuse layers on the measuring result, so as to obtain an optimum result in relation to the circumstances (wind speed and other meteorological conditions).

A further problem is one of providing means which enable the apparatus for transmitting and receiving sound waves when measuring the speed and/or the direction of the wind and using a parabolic dish, to be so designed as to enable it to concentrate high levels of energy to narrow lobes, while using relatively small antennae.

Another problem is one of creating conditions which will ensure that the echo signals received are not obstructed by the sound transmitter, and that said echo signals can be reflected in the parabolic dish to the focus of the parabola, so as to be conducted therefrom to the microphone with but small losses.

Solution

These desiderata and problems are satisfied and overcome by means of the present invention, which relates to an apparatus for measuring wind speed and/or direction with the aid of a sound-wave transmitter and a receiver for receiving reflected sound waves, in which the sound waves are transmitted in a plurality of directions, and in which a compilation of the results obtained with each measuring operation provides a measure of the speed and/or direction of the wind, said apparatus being mainly characterized in that the transmitter and/or the receiver are arranged to rotate so as to enable, during the revolution, the evaluation of the measuring result obtained from a multiplicity of measuring occasions, and in that the transmitter and/or the receiver is, or are, inclined relative to their respective axes of rotation.

In accordance with one embodiment of the invention the transmitter, and optionally also the receiver, is, or are arranged on a rotatable dish, from which there extends an upwardly tapering, conical casing.

The transmitter, and when present also the receiver, are preferably located adjacent the periphery of the dish.

Advantageously, means are provided whereby the rotation and position of the dish when transmitting and receiving, can be evaluated against a reference direction.

In accordance with a further embodiment of the invention, the doppler shifts occurring in the echo signals received are related to the sound waves transmitted, and are detected and processed in a manner to obtain the magnitude and direction of a wind component corresponding to the signal character, and if so desired projected onto right-angle coordinates.

There is also proposed in accordance with the invention apparatus for transmitting and receiving sound waves in order to measure the speed and/or direction of the wind, which utilizes a parabolic dish. It is proposed that such an apparatus is provided with a tube having one end thereof placed in the focus of the parabolic dish and the other end of which co-acts with a loudspeaker/microphone. Conveniently, the tube has a substantially U-shaped configuration, whereby the loudspeaker/microphone will be located on one side of the parabolic dish.

It is possible with the use of such apparatus, to transmit the sound waves with the aid of narrow lobes, thereby using but a low level of energy.

Advantages

The main advantages afforded by the invention are that such an antenna system obtains a compact and robust design, while enabling the directions in which the measurements are taken, to provide said evaluatable results, to be so selected as to minimize the amount of background noise received and to reduce the effect of other circumstances and conditions which have previously affected the sensitivity of such apparatus.

When using apparatus according to the invention it is also possible to transmit narrow lobes of sound waves, requiring but small amounts of energy, and to obtain greater possibility of receiving signals reflected by layers in the air space.

The main characteristic features of the invention are set forth in the following claims.

BRIEF DESCRIPTION OF THE DRAWINGS

The invention will now be described in more detail with reference to a preferred embodiment thereof which exhibits the more significant characterizing features of the invention and which is illustrated in the accompanying drawings, where.

DESCRIPTION OF AN EMBODIMENT AT PRESENT PREFERRED

Figure 1:
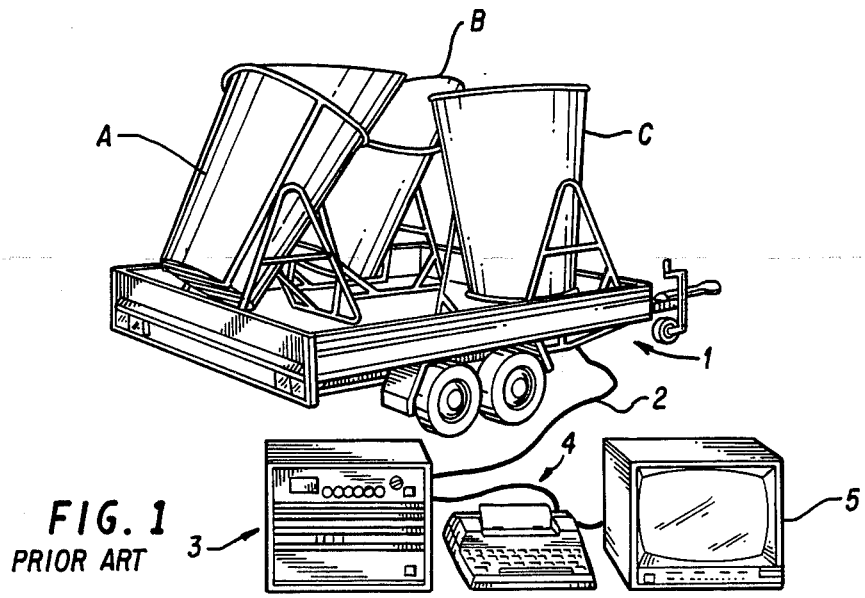
FIG. 1 illustrates a known antenna system placed on a trailer, and connected to electronic equipment designed to evaluate the measuring results obtained.

FIG. 1 illustrates in perspective an apparatus for measuring the speed and/or direction of the wind with the aid of a sound-wave transmitter and a receiver for receiving sound waves reflected by temperature layers in air space, in which apparatus the sound waves are transmitted in a plurality of directions and a compilation of the measuring results obtained with each measuring operation provides a measure of the wind-speed and/or direction. To this end the apparatus comprises three antennae, referenced A, B and C, placed on a trailer 1. These antennae A, B and C are connected through a conductor 2 to a piece of electronic equipment 3, to which are connected a terminal 4 and a display unit 5.

Each of the antennae A, B and C incorporates a loudspeaker, and the antennae A and B are arranged to form a right-angle with one another and are inclined at an angle of 60° to the plane of the ground, while the third antenna is vertical.

The described system is able to estimate wind components between 50 and 500 meters, and in particularly favourable conditions even up to 1000 meters. It is doubtful that the apparatus is capable of assessing wind components beneath 50 meters.

The system has the following mode of operation.

The three antennae A, B and C, of which two, A and B, are inclined and one, C, is vertical, are arranged to transmit sound waves alternately. All the antennae A, B and C function both as a transmitter and as a receiver, and from information obtained in received signals reflected from temperature layers, related to transmitted signals, it is possible to assess the magnitude and direction of prevailing radial wind components.

The two inclined antennae A and B extend at 90° to one another and are inclined to the plane of the ground at an angle of 60°, these two antennae being capable of producing orthogonal wind components, which are assessed and compiled to horizontal wind vectors, whose direction and strength can be presented. The direction and strength of the wind are measured by comparing the transmission frequency with the echo frequency of the received signals.

At the same time as the wind is measured, the echo intensity from the vertical antenna is sensed.

Figure 2:
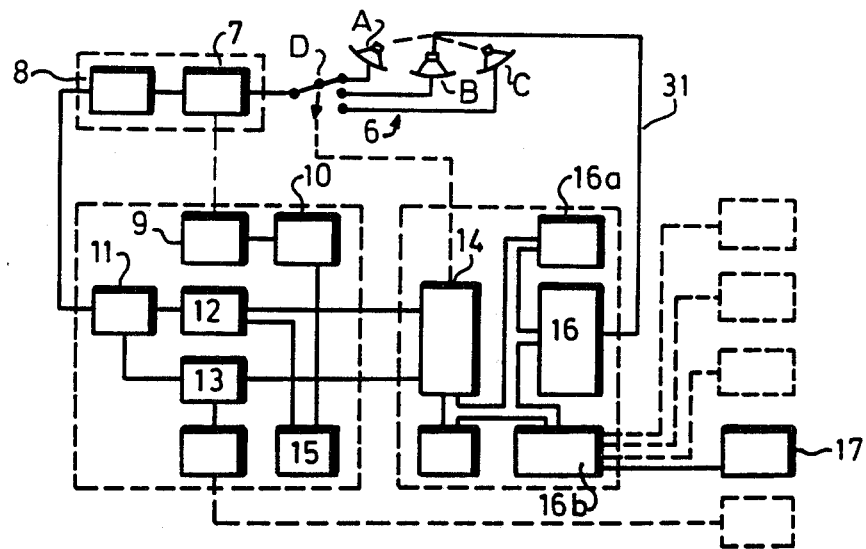
FIG. 2 is a block schematic illustrating the electronic equipment used to effect said evaluation.

The electronic equipment used to enable the speed and/or the strength of the wind to be measured with the aid of transmitters and receivers A, B and C is illustrated in FIG. 2. Each of the antennae is connected by a respective conductor 6 directly to a transmitter and receiver switch means 7 (with the exception of switch D), which is coupled to a preamplifier 8 and to a power amplifier 9, coupled to a tone-pulse generator 10.

The preamplifier 8 is connected to a high-pass filter 11, which in turn is connected to a doppler detector 12 and an echo-intensity detector 13. The doppler detector 12 and the echo-intensity detector 13 are connected to an A/D-converter 14. There is also provided a trigger circuit 15 arranged to trigger the tone-pulse generator 10 and the doppler detector 12.

Desired information can be sent to different terminals, of which only one, 17, is shown, with the aid of the A/D-converter and a data processor 16 and associated program 16a, via an interface 16b. The information can also be transferred, however, to magnetic tape, cassette tape, or a colour display.

Figure 3:
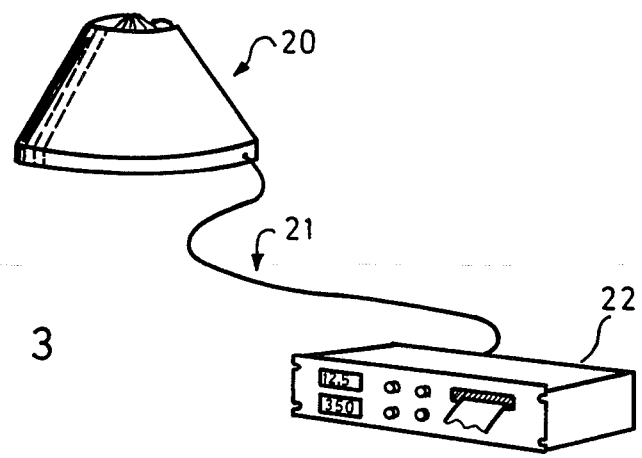
FIG. 3 illustrates schematically an antenna arrangement according to the invention.

FIG. 3 illustrates schematically an antenna arrangement 20 constructed in accordance with the present invention. This arrangement may also advantageously incorporate a power amplifier and preamplifier. The antenna arrangement is connected to a calculating and presentation unit 22, principly, the design illustrated in FIG. 2, by means of a conductor 21.

Figure 4:
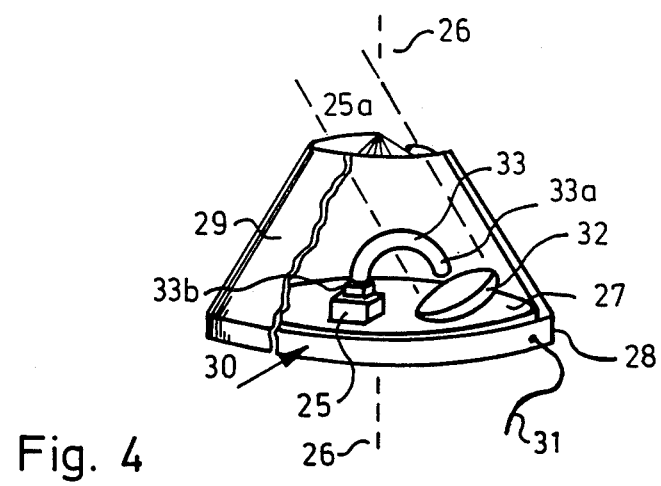
FIG. 4 is a sectional view of the antenna arrangement shown in FIG. 3.

A partially sectioned view of the antenna arrangement 20 is illustrated in FIG. 4. Referring now to FIG. 4, there is shown an apparatus for measuring wind strength and/or direction with the aid of a sound-wave transmitter 25 and a receiver for receiving reflected sound waves. Both the transmitter and the receiver are incorporated in a single unit 29. The sound waves 25a can be transmitted in a plurality of directions, whereupon a compilation of the measuring results obtained with each measuring operation provides a measure of the wind speed and/or direction in the manner previously schematically described. In the illustrated embodiment, the transmitter and receiver 25 are arranged to rotate, so as to be able to evaluate the measuring results obtained from a plurality of measuring locations. The transmission lobe 25a is arranged to slope relative to an axis of rotation 26.

In the illustrated embodiment, the transmitter and receiver 25 are mounted on a rotatable table 27. The actual antenna apparatus includes a bottom plate 28 and a conically tapering casing 29 which extends upwardly from the bottom plate 28. The transmitter, and optionally also the receiver, is, or are, located adjacent the periphery of the table 27.

It is necessary to allot to the antenna apparatus, and particularly to the bottom plate 28, a reference direction, so as to be able to determine the rotation and the setting position of the transmitter in relation to the bottom plate 28. To this end, the apparatus of FIG. 4 is provided with a compass means 30, which will not be described in detail.

The three antennae A, B and C illustrated in FIG. 2 can be given different setting positions for one and the same receiver and/or transmitter. As illustrated in FIG. 2, each of the antennae can be activated over selected time periods by means of a switch or contact "D", such activation being controlled through a conductor leading to the A/D-converter 14.

Since the use of signals deriving from a compass arrangement and means for establishing the momentary position of the transmitter-and-receiver arrangement belongs to the known art, such use will not be described in detail here. It is sufficient to establish that data relating to the reference direction and to the position of the antenna apparatus in relation to said reference direction when activating a receiver and/or transmitter is transmitted to the microprocessor 16, via a conductor 31.

It is thus obvious that doppler shifts occurring in received echo signals and related to transmitted sound waves are detected and processed, to give wind components corresponding to these criteria. Because it is possible to determine which of the three measuring locations will provide the best total measuring result, it is possible in accordance with the invention to select optimal measuring directions. It is also possible to select the best direction in which to carry out each of the measuring operations.

The present invention also relates to an arrangement for transmitting and receiving sound waves in order to measure the speed and/or direction of the wind, with the aid of one and the same parabolic dish 32. A tube has one end 33a thereof placed in the focus of the parabolic dish 32, while the other end 33b of the tube is arranged to co-act with a loudspeaker/microphone. The tube 33 is curved to substantially a U-shaped configuration, such that the loudspeaker/microphone is located in the vicinity of the rim or edge of the dish 32.

The tube is also formed with parallel wall portions, so as to restrict the losses occurring as the sound waves pass through the tube 33.

It is known that the lobe emitted from the mouth 33a of a tube is dependent upon frequency. It is also important that transmitted signals, and even more important that received echo signals can be captured in the focus of the parabolic dish.

Consequently, the diameter of the mouth of said tube, the distance of said mouth from the parabolic dish, and the form of the parabolic dish shall be selected with the aforementioned circumstances in mind. Thus, it can be mentioned that if the sound waves are allowed to lie within a frequency band of 2000-3000 Hz, the diameter of the tube should be about 5 cm. This enables the sound waves to be transmitted with the use of but a small amount of energy and with the aid of a narrow lobe, while improving reception of the echo signals at the same time.

The mouth 33a of the tube shall be so located that the focus of the parabolic dish lies somewhat within the tube, and the tube should have parallel wall-portions at least in the vicinity of the mouth thereof.

With the aid of such apparatus it is possible to determine those directions in which the lobe 25a can be pointed in order to give the least possible disturbances from background noise, rain and not-readily definable temperature layers etc in the air space.

When using the proposed apparatus, it has been possible to determine the speed and direction of the wind at levels as low as 10 meters.

It is also possible to place loudspeaker and/or microphone, which at these powers is, or are, of large physical dimensions, on one side of the focus of the parabola, such as not to lie in the path of the signals. It is also possible to construct a small parabola with a narrow transmission lobe for high power outputs, with the loudspeaker lying outside the lobe, such that only the tube lies in the path of the signals.

It will be understood that the single frequency range recited in the description is only given by way of example and that other frequencies lying within the ultrasonic band can also be applied.

It will also be understood that although both the transmitter and the receiver of the described embodiment are arranged on the dish for rotation therewith, they may also be stationarily arranged, so as not to accompany the dish in its movement.

Finally, although it is stated in the description of the illustrated embodiment that a given compass direction is introduced into the apparatus, against which the measuring directions are related, it is also possible to orientate a used unit in a predetermined direction at each erection site.

The invention is naturally not restricted to the aforedescribed, exemplary embodiment, and many modifications can be made within the scope of the following claims.

What is claimed is:

1. Apparatus for measuring windspeed and/or direction with the aid of a sound-wave transmitter and a receiver for receiving reflected sound waves, in which apparatus the sound waves are transmitted in a plurality of directions, and in which a compilation of the measuring result obtained for each measuring operation gives a measure of the speed and direction of the wind, characterized in that the transmitter and/or the receiver is, or are, arranged to rotate, so as to enable the evaluation of measuring results obtained from a multiplicity of measuring locations during revolution; and in that the transmission lobe is inclined in relation to the axis of rotation of said transmitter and/or receiver.

2. Apparatus according to claim 1, characterized in that the transmitter, and optionally also the receiver is, or are, mounted on a rotatable table having a tapering, conical casing extending upwardly therefrom.

3. Apparatus according to claim 2, characterized in that the transmitter, and optionally also the receiver is, or are, arranged in the vicinity of the periphery of said table.

4. Apparatus according to claim 3, characterized in that the rotational position of the transmitter, and optionally also the receiver, when a measurement is taken, is determined in relation to a reference direction.

5. Apparatus according to claim 2, characterized in that the rotational position of the transmitter, and optionally also the receiver, when a measurement is taken, is determined in relation to a reference direction.

6. Apparatus according to claim 2, characterized in that dopper shifts occurring in the received echo signals and related to transmitted acoustic signals are detected and processed to give wind components relating to magnitude and direction, corresponding to these criteria.

7. Apparatus according to claim 1, characterized in that the transmitter, and optionally also the receiver is, or are, arranged in the vicinity of the periphery of said table.

8. Apparatus according to claim 7, characterized in that the rotational position of the transmitter, and optionally also the receiver, when a measurement is taken, is determined in relation to a reference direction.

9. Apparatus according to claim 7, characterized in that dopper shifts occurring in the received echo signals and related to transmitted acoustic signals are detected and processed to give wind components relating to magnitude and direction, corresponding to these criteria.

10. Apparatus according to claim 1, characterized in that the rotational position of the transmitter, and optionally also the receiver, when a measurement is taken, is determined in relation to a reference direction.

11. Apparatus according to claim 10, characterized in that dopper shifts occurring in the received echo signals and related to transmitted acoustic signals are detected and processed to give wind components relating to magnitude and direction, corresponding to these criteria.

12. Apparatus according to claim 1, characterized in that dopper shifts occurring in the received echo signals and related to transmitted acoustic signals are detected and processed to give wind components relating to magnitude and direction, corresponding to these criteria.

13. A device for transmitting and receiving sound waves for measuring wind speed and direction and for preferred use in an apparatus according to claim 1, said device including a dish of parabolic configuration and a tube arranged so that one end thereof is located in the focus of the parabolic dish, while the other end of said tube co-acts with said transmitter and/or receiver.

14. Apparatus according to claim 13, characterized in that the tube is curved to a substantially "U"-shaped configuration; and in that the said transmitter and/or receiver is located to one side of the parabolic dish.

15. Apparatus according to claim 14, characterized in that the tube has parallel sides, at least at the mouth portion thereof; and in that the diameter of the tube is adapted, inter alia, to the frequency of the transmitted sound waves.

16. Apparatus according to claim 14, characterized in that said sound waves are transmitted with the aid of a narrow lobe and with solely the tube located in the path of the signals.

17. Apparatus according to claim 13, characterized in that the tube has parallel sides, at least at the mouth portion thereof; and in that the diameter of the tube is adapted, inter alia, to the frequency of the transmitted sound waves.

18. Apparatus according to claim 17, characterized in that said sound saves are transmitted with the aid of a narrow lobe and with solely the tube located in the path of the signals.

19. Apparatus according to claim 13, characterized in that said sound waves are transmitted with the aid of a narrow lobe and with solely the tube located in the path of the signals.

* * * * *